(12) United States Patent
Chen et al.

(10) Patent No.: US 11,425,407 B2
(45) Date of Patent: Aug. 23, 2022

(54) SYSTEM AND METHOD FOR SIGNALING OF MOTION MERGE MODES IN VIDEO CODING

(71) Applicant: BEIJING DAJIA INTERNET INFORMATION TECHNOLOGY CO., LTD., Beijing (CN)

(72) Inventors: Yi-Wen Chen, San Diego, CA (US); Xianglin Wang, San Diego, CA (US)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/364,504

(22) Filed: Jun. 30, 2021

(65) Prior Publication Data

US 2021/0400294 A1 Dec. 23, 2021

Related U.S. Application Data

(63) Continuation of application No. PCT/US2019/068977, filed on Dec. 30, 2019.

(Continued)

(51) Int. Cl.
*H04N 19/46* (2014.01)
*H04N 19/13* (2014.01)
(Continued)

(52) U.S. Cl.
CPC ............ *H04N 19/46* (2014.11); *H04N 19/13* (2014.11); *H04N 19/159* (2014.11); *H04N 19/176* (2014.11)

(58) Field of Classification Search
CPC ...... H04N 19/46; H04N 19/176; H04N 19/13; H04N 19/159
See application file for complete search history.

(56) References Cited

U.S. PATENT DOCUMENTS 9,066,104 B2 6/2015 Wang et al.
2012/0320984 A1* 12/2012 Zhou ...................... H04N 19/50
375/E7.125

(Continued)

FOREIGN PATENT DOCUMENTS

WO 2020117619 A1 6/2020

OTHER PUBLICATIONS

International Search Report and Written Opinion of PCT Application No. PCT/US2019/068977 dated Apr. 23, 2020, (8p).

(Continued)

*Primary Examiner* — Dramos Kalapodas
(74) *Attorney, Agent, or Firm* — Arch & Lake LLP

(57) ABSTRACT

The present disclosure relates to a method for deriving constructed affine merge candidates. The method includes acquiring, from a decoder, a regular merge flag for a coding unit (CU) which is coded as merge mode and merge related modes, when the regular merge flag is one, indicating that regular merge mode or merge mode with motion vector differences (MMVD) is used by the CU, constructing a motion vector merge list for the CU and using regular merge index to indicate which candidate is used, and when the regular merge flag is zero, indicating regular merge mode is not used by the CU, and further receiving mode flags to indicate associated merge related modes are used when a mode flag's constraints are met.

20 Claims, 10 Drawing Sheets

Related U.S. Application Data

(60) Provisional application No. 62/787,230, filed on Dec. 31, 2018.

(51) Int. Cl.
*H04N 19/159* (2014.01)
*H04N 19/176* (2014.01)

(56) References Cited

U.S. PATENT DOCUMENTS

| | | | |
|---|---|---|---|
| 2013/0016785 A1 | 1/2013 | Wang et al. | |
| 2015/0092851 A1* | 4/2015 | Yoshikawa | H04N 19/157 375/240.13 |
| 2015/0264372 A1* | 9/2015 | Kolesnikov | H04N 19/52 375/240.16 |
| 2016/0057420 A1* | 2/2016 | Pang | H04N 19/124 375/240.16 |
| 2017/0013276 A1* | 1/2017 | Chen | H04N 19/46 |
| 2017/0188044 A1* | 6/2017 | Takehara | H04N 19/52 |
| 2017/0214932 A1* | 7/2017 | Huang | H04N 19/52 |
| 2017/0280159 A1* | 9/2017 | Xu | H04N 19/593 |
| 2018/0077417 A1 | 3/2018 | Huang | |
| 2018/0227582 A1 | 8/2018 | Park et al. | |
| 2018/0316913 A1* | 11/2018 | Jun | H04N 19/103 |
| 2018/0332279 A1* | 11/2018 | Kang | H04N 19/51 |
| 2021/0006788 A1* | 1/2021 | Zhang | H04N 19/46 |
| 2021/0006790 A1* | 1/2021 | Zhang | H04N 19/137 |
| 2021/0144366 A1* | 5/2021 | Zhang | H04N 19/70 |
| 2021/0152816 A1* | 5/2021 | Zhang | H04N 19/70 |
| 2022/0021900 A1* | 1/2022 | Jeong | H04N 19/513 |

OTHER PUBLICATIONS

First Office Action of Indian Patent Application 202147029403, dated Mar. 4, 2022 with English translation, (6p).

First Office Action of Japanese Application No. 2021-538770 dated Dec. 14, 2021 with machine translation, (12p).

Rejection Decision of Japanese Application No. 2021-538770 with machine translation dated Feb. 22, 2022, 6p).

Bross, Benjamin, et al., "Versatile Video Coding (Draft 3)", Joint Video Experts Team (JVET) of ITU-T SG 16 WP 3 and ISO/IEC JTC I/SC 29/WG11, JVET-L1001-v7, 12th Meeting: Macao, China, Oct. 3-12, 2018, (13p).

Bross, Benjamin, et al., "Versatile Video Coding (Draft 6)", Joint Video Experts Team (JVET) of ITU-T SG 16 WP 3 and ISO/IEC JTC I/SC 29/WG11, JVET-O2001-vE, 15th Meeting: Gothenburg, SE, Jul. 3-12, 2019, (113p).

Chen, Yi-Wen, et al., "Non-CE4: Regular Merge Flag Coding", Joint Video Experts Team (JVET) of ITU-T SG 16 WP 3 and ISO/IEC JTC I/SC 29/WG11, JVET-M0231, 13th Meeting: Marrakech, MA, Jan. 9-18, 2019, (3p).

Huang, Han, et al., "Non-CE4: Merge Modes Signaling", Joint Video Experts Team (JVET) of ITU-T SG 16 WP 3 and ISO/IEC JTC I/SC 29/WG11, JVET-O0249, 15th Meeting: Gothenburg, SE, Jul. 3-12, 2019, (10p).

Supplementary EP Search Report issued to EP Application No. 19907518.5 dated Feb. 11, 2022, (4p).

EP Communication of EP Application No. 19907518.5 dated Feb. 23, 2022, (9p).

Office Action issued to Korean Application No. 2021-7020439 dated Mar. 24, 2022 with English translation, (9p).

Brass, Benjamin et al., "Versatile Video Coding (Draft 3)", Joint Video Experts (JVET) of ITU-T SG 16 WP 3 and ISO/IEC JTC 1/SC 29/WG 11, JVET-L1001-V7, 12 Meeting: Macao, China, Oct. 3-12, 2018, (223p).

Hashimoto, Tomonori, et al., CE4: Enhanced Merge with MVD (Test 4.4.4), Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0060-WD, (18p).

Chen, Jianle, et al., "Algorithm description for Versatile Video Coding and Test Model 3 (VTM3)", Joint Video Experts Team (JVET) of ITU-T SG 16 WP 3 and ISO/IEC JTC 1/SC 29/WG 11, JVET-L1002-v1, 12th Meeting: Macao, China, Oct. 3-12, 2018, (48p).

Chen, Yi-Wen, et al., "CE4: Regular merge flag coding", (CE4-1.2.a and CE4-1.2.b), Joint Video Exploration Team (JVET) of ISO/IEC JTC1/SC29/WG11 and ITU-T SG.16), JVET-N0324, Mar. 16, 2019, (3p).

Brass, Benjamin et al., "Versatile Video Coding (Draft 3)", Joint Video Experts (JVET) of ITU-T SG 16 WP 3 and ISO/IEC JTC 1/SC 29/WG 11, JVET-L1001-v7, 12 Meeting: Macao, China, Oct. 3-12, 2018, (221p).

* cited by examiner

SYSTEM AND METHOD FOR SIGNALING OF MOTION MERGE MODES IN VIDEO CODING

CROSS-REFERENCE TO RELATED APPLICATIONS

This application is a continuation of International Application No.: PCT/US2019/068977, filed on Dec. 30, 2019, which is based upon and claims priority to Provisional Application No. 62/787,230 filed on Dec. 31, 2018, the disclosures of which are incorporated in their entireties herein by reference for all purposes.

TECHNICAL FIELD

This application is related to video coding and compression. More specifically, this application relates to systems and methods for signaling of motion merge modes in video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate while avoiding or minimizing degradations to video quality.

SUMMARY

Examples of the present disclosure provide methods for improving the efficiency of the syntax signaling of merge related modes.

According to a first aspect of the present disclosure, a computer-implemented method for motion prediction, comprising acquiring, from the decoder, a regular merge flag for a coding unit (CU) which is coded as merge mode and merge related modes, when the regular merge flag is one, indicating that regular merge mode or merge mode with motion vector differences (MMVD) is used by the CU, constructing a motion vector merge list for the CU and using regular merge index to indicate which candidate is used, and when the regular merge flag is zero, indicating regular merge mode is not used by the CU, and further receiving mode flags to indicate the associated merge related modes are used when the mode flag's constraints are met.

According to a second aspect of the present disclosure, a computing device comprising one or more processors, a non-transitory computer-readable memory storing instructions executable by the one or more processors, where the one or more processors are configured to acquire, from the decoder, a regular merge flag for a coding unit (CU) which is coded as merge mode and merge related modes, when the regular merge flag is one, indicate that regular merge mode or merge mode with motion vector differences (MMVD) is used by the CU, construct a motion vector merge list for the CU and using regular merge index to indicate which candidate is used, and when the regular merge flag is zero, indicate regular merge mode is not used by the CU, and further receive mode flags to indicate the associated merge related modes are used when the mode flag's constraints are met.

According to a third aspect of the present disclosure, a non-transitory computer-readable storage medium having stored therein instructions is provided. When the instructions are executed by one or more processors of the apparatus, the instructions cause the apparatus to acquiring, from the decoder, a regular merge flag for a coding unit (CU) which is coded as merge mode and merge related modes, when the regular merge flag is one, indicating that regular merge mode or merge mode with motion vector differences (MMVD) is used by the CU, constructing a motion vector merge list for the CU and using regular merge index to indicate which candidate is used, and when the regular merge flag is zero, indicating regular merge mode is not used by the CU, and further receiving mode flags to indicate the associated merge related modes are used when the mode flag's constraints are met.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Video Coding System

Conceptually, video coding standards are similar. For example, many use block-based processing and share similar video coding block diagram to achieve video compression.

In this embodiment of the present disclosure, several methods are proposed to improve the efficiency of the syntax signaling of merge related modes. It is noted that the proposed methods may be applied independently or combinedly.

Figure 1:
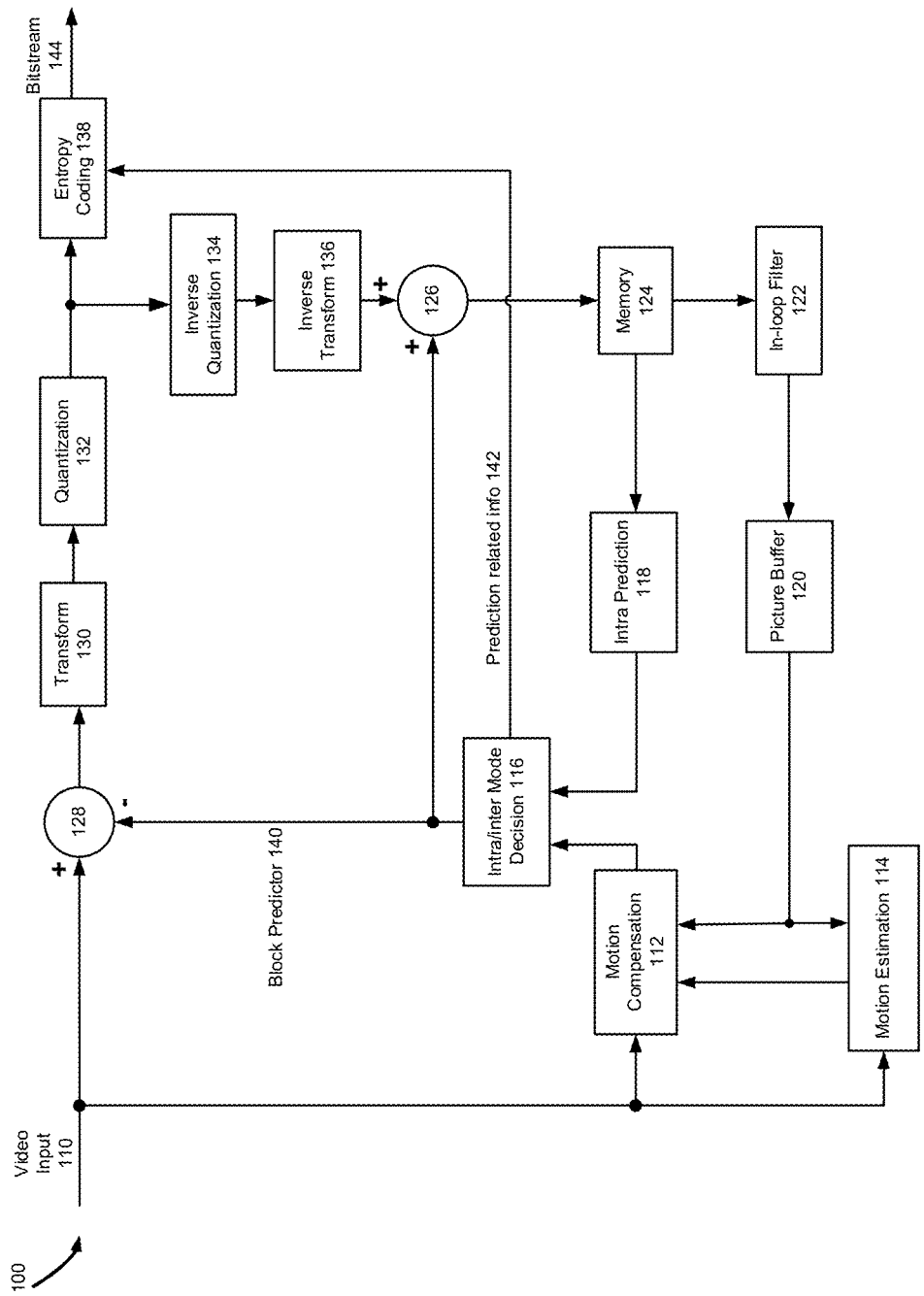
FIG. 1 is a block diagram of an encoder, according to an example of the present disclosure.

FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In an example embodiment of the encoder, a video frame is partitioned into blocks for processing. For each given video block, a prediction is formed based on either inter prediction or intra prediction. In inter prediction, predictors may be formed through motion estimation and motion compensation, based on pixels from previously reconstructed frames. In intra prediction, predictors may be formed based on reconstructed pixels in the current frame. Through mode decision, a best predictor may be chosen to predict a current block.

The prediction residual (i.e., the difference between a current block and its predictor) is sent to transform module. Transform coefficients are then sent to quantization module for entropy reduction. Quantized coefficients are fed to entropy coding module to generate compressed video bitstream. As shown in FIG. 1, prediction related info from inter and/or intra prediction modules, such as block partition info, motion vectors, reference picture index, and intra prediction mode, etc., are also going through entropy coding module and saved into bitstream.

In the encoder, decoder related modules are also needed in order to reconstruct pixels for prediction purposes. First, prediction residual is reconstructed through inverse quantization and inverse transform. Such reconstructed prediction residual is combined with the block predictor to generate un-filtered reconstructed pixels for a current block.

To improve coding efficiency and visual quality, in-loop filter is commonly used. For example, deblocking filter is available in AVC, HEVC as well as the current VVC. In HEVC, an additional in-loop filter called SAO (sample adaptive offset) is defined to further improve coding efficiency. In the latest VVC, yet another in-loop filter called ALF (adaptive loop filter) is being actively investigated, and it has a high chance of being included in the final standard.

Figure 2:
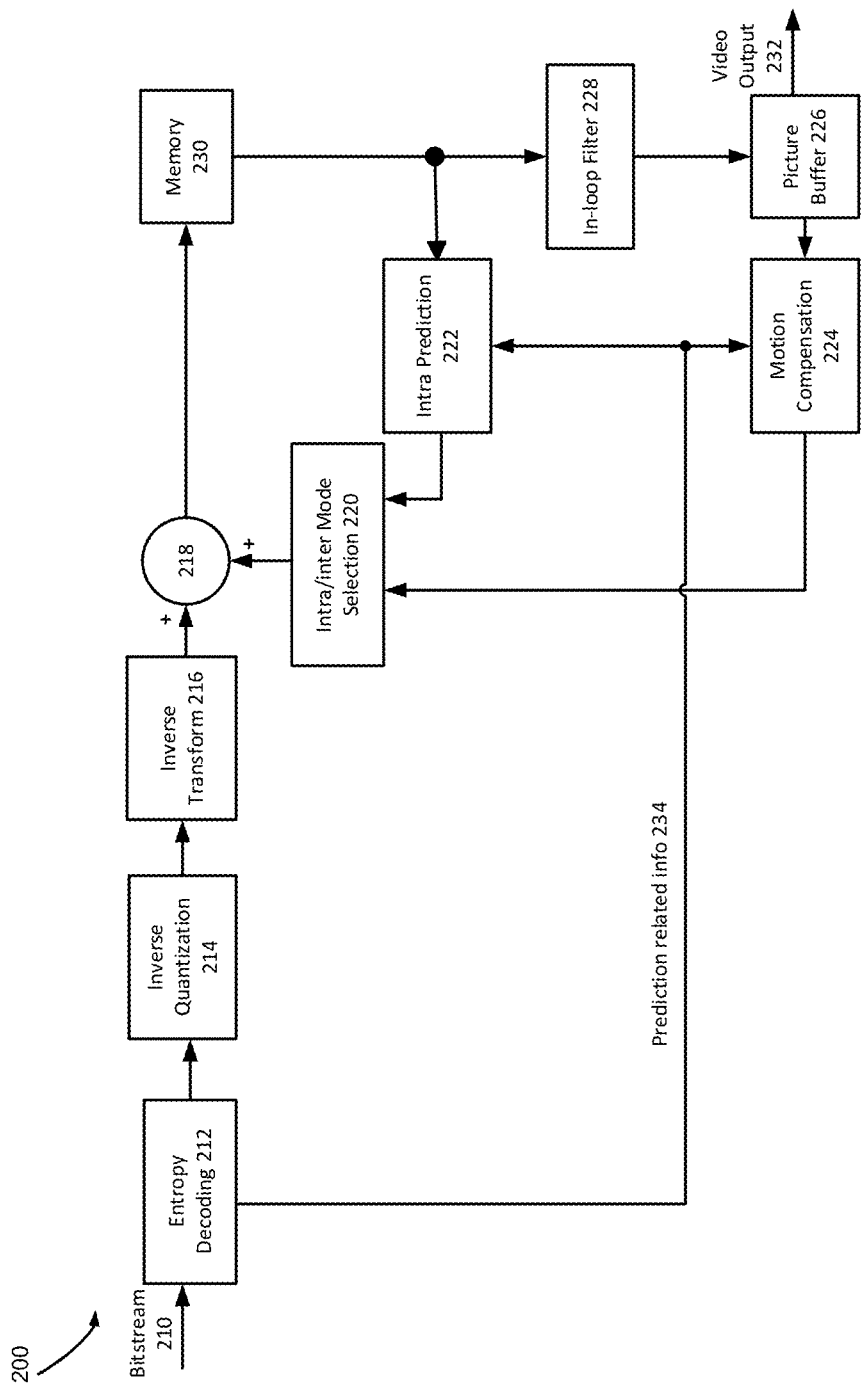
FIG. 2 is a block diagram of a decoder, according to an example of the present disclosure.

FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

In the decoder, bitstream is first decoded through entropy decoding module to derive quantized coefficient levels and prediction related info. Quantized coefficient levels are then processed through inverse quantization and inverse transform modules to obtain reconstructed prediction residual. Block predictor is formed through either intra prediction or motion compensation process based on prediction info decoded. The unfiltered reconstructed pixels are obtained by summing up the reconstructed prediction residual and the block predictor. In case in-loop filter is turned on, filtering operations are performed on these pixels to derive the final reconstructed video for output.

Figure 3:
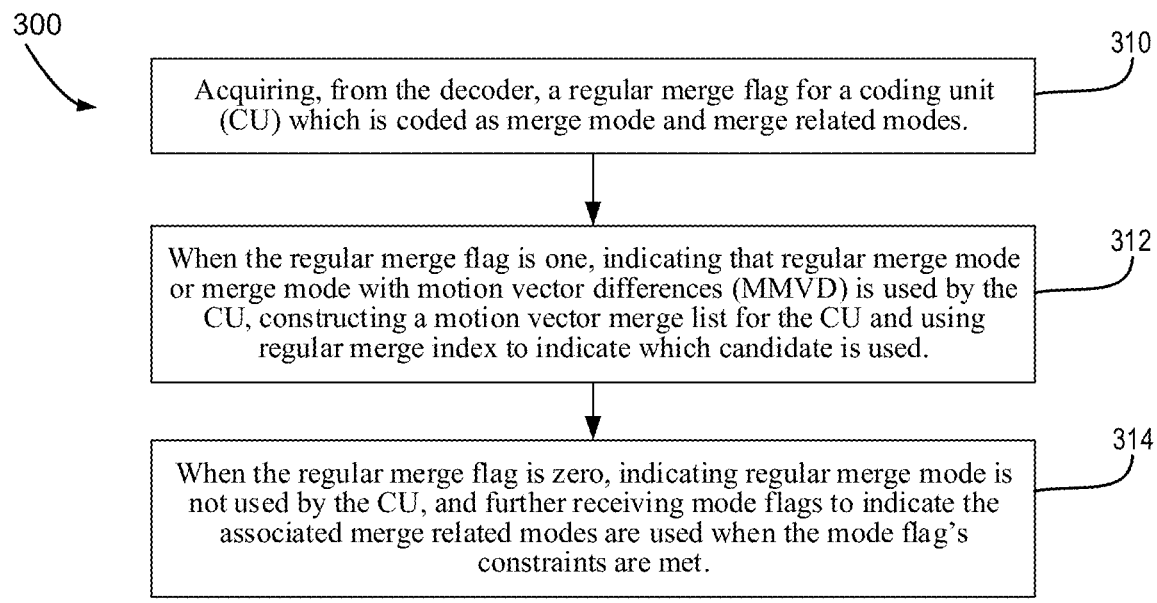
FIG. 3 is a flow chart illustrating a method for deriving constructed affine merge candidates, according to an example of the present disclosure.

FIG. 3 shows an example method for deriving constructed affine merge candidates in accordance with the present disclosure.

In step 310, acquiring, from the decoder, a regular merge flag for a coding unit (CU), which is coded as merge mode and merge related modes.

In step 312, when the regular merge flag is one, indicating that regular merge mode or merge mode with motion vector differences (MMVD) is used by the CU, constructing a motion vector merge list for the CU and using regular merge index to indicate which candidate is used.

In step 314, when the regular merge flag is zero, indicating regular merge mode is not used by the CU, and further receiving mode flags to indicate the associated merge related modes are used when the mode flag's constraints are met.

Figure 4:
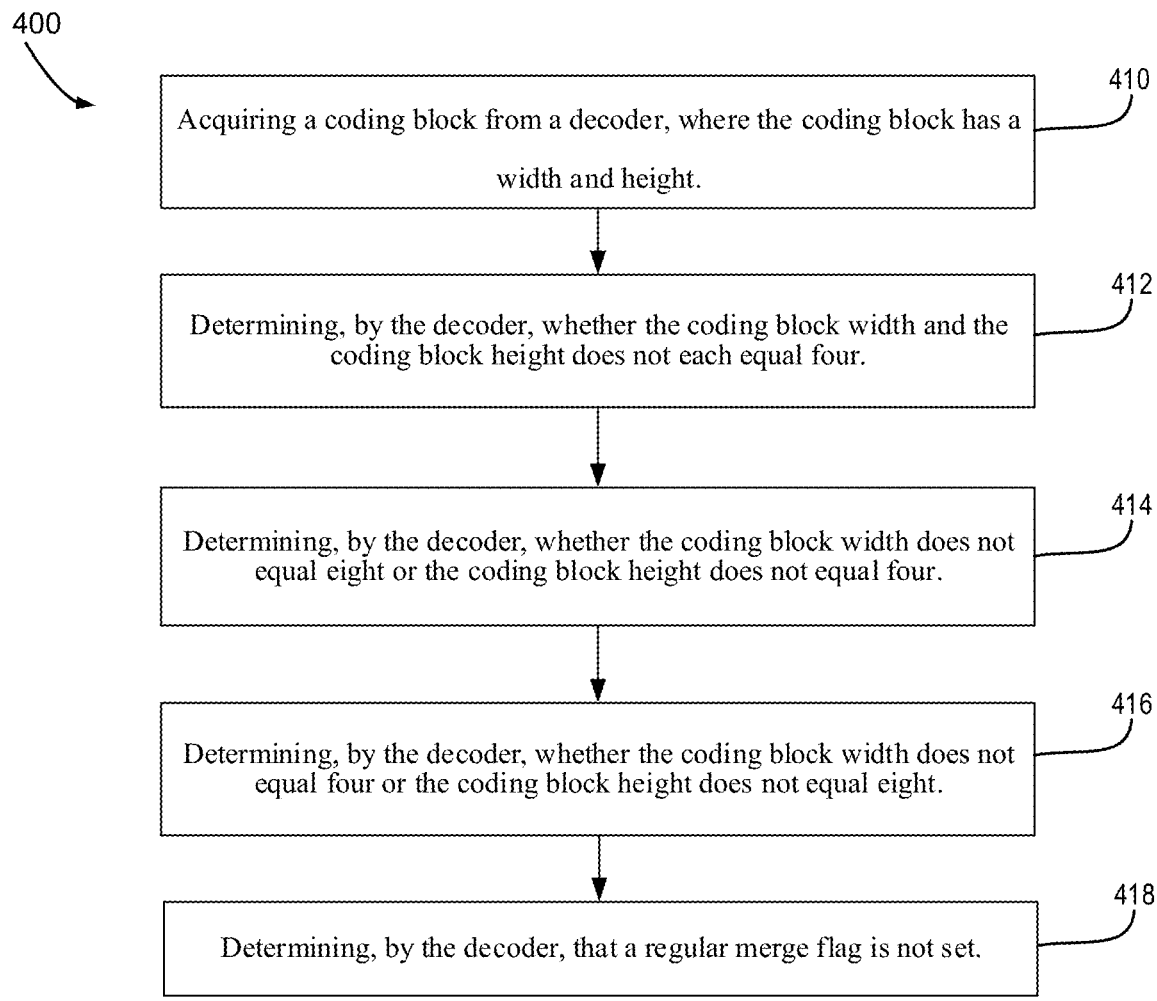
FIG. 4 is a flow chart illustrating a method for determining whether flag constraints are met, according to an example of the present disclosure.

FIG. 4 shows an example method for determining whether flag constraints are met in accordance with the present disclosure.

In step 410, acquiring a coding block from a decoder, wherein the coding block has a width and height.

In step 412, determining, by the decoder, whether the coding block width and the coding block height does not each equal four.

In step 414, determining, by the decoder, whether the coding block width does not equal eight or the coding block height does not equal four.

In step 416, determining, by the decoder, whether the coding block width does not equal four or the coding block height does not equal eight.

In step 418, determining, by the decoder, that a regular merge flag is not set.

Versatile Video Coding (VVC)

At the 10th JVET meeting (Apr. 10-20, 2018, San Diego, US), JVET defined the first draft of Versatile Video Coding (VVC) and the VVC Test Model 1 (VTM1) encoding method. It was decided to include a quadtree with nested multi-type tree using binary and ternary splits coding block structure as the initial new coding feature of VVC. Since then, the reference software VTM to implement the encoding method and the draft VVC decoding process has been developed during the JVET meeting.

The picture partitioning structure divides the input video into blocks called coding tree units (CTUs). A CTU is split using a quadtree with nested multi-type tree structure into coding units (CUs), with a leaf coding unit (CU) defining a region sharing the same prediction mode (e.g. intra or inter). In this document, the term 'unit' defines a region of an image covering all components; the term 'block' is used to define a region covering a particular component (e.g. luma) and may differ in spatial location when considering the chroma sampling format such as 4:2:0.

Extended Merge Modes in VVC

In VTM3, the merge candidate list is constructed by including the following five types of candidates in order:
1. Spatial MVP from spatial neighbor CUs
2. Temporal MVP from collocated CUs
3. History-based MVP from an FIFO table
4. Pairwise average MVP
5. Zero MVs.

The size of merge list is signaled in slice header, and the maximum allowed size of merge list is 6 in VTM3. For each CU code in merge mode, an index of best merge candidate is encoded using truncated unary binarization (TU). The first bin of the merge index is coded with context, and bypass coding is used for other bins. In the following context of this disclosure, this extended merge mode is also called regular merge mode since its concept is the same as the merge mode used in HEVC.

Merge Mode With MVD (MMVD)

In addition to merge mode, where the implicitly derived motion information is directly used for prediction samples generation of the current CU, the merge mode with motion vector differences (MMVD) is introduced in VVC. A MMVD flag is signaled right after sending a skip flag and merge flag to specify whether MMVD mode is used for a CU.

In MMVD, after a merge candidate is selected, it is further refined by the signaled MVDs information. The further information includes a merge candidate flag, an index to specify motion magnitude, and an index for indication of motion direction. In MMVD mode, one for the first two candidates in the merge list is selected to be used as MV basis. The merge candidate flag is signaled to specify which one is used.

Distance index specifies motion magnitude information and indicate the pre-defined offset from the starting point. As shown in FIG. 5 (described below), an offset is added to either horizontal component or vertical component of starting MV. The relation of distance index and pre-defined offset is specified in Table 1

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | 1/4 | 1/2 | 1 | 2 | 4 | 8 | 16 | 32 |

Direction index represents the direction of the MVD relative to the starting point. The direction index can represent the four directions, as shown in Table 2. It's noted that the meaning of MVD sign could be variant according to the information of starting MVs. When the starting MVs is an un-prediction MV or bi-prediction MVs with both lists point to the same side of the current picture (i.e., POCs of two references are both larger than the POC of the current picture, or are both smaller than the POC of the current picture), the sign in Table 2 specifies the sign of MV offset added to the starting MV. When the starting MVs is bi-prediction MVs with the two MVs point to the different sides of the current picture (i.e., the POC of one reference is larger than the POC of the current picture, and the POC of the other reference is smaller than the POC of the current picture), the sign in Table 2 specifies the sign of MV offset added to the list0 MV component of starting MV and the sign for the list1 MV has opposite value.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

Figure 5A:
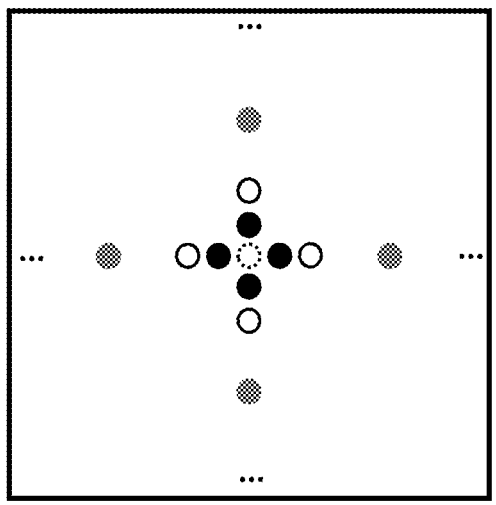
FIG. 5A is a diagram illustrating an MMVD search point, according to an example of the present disclosure.

FIG. 5A shows a diagram illustrating an MMVD search point for a first list (L0) reference in accordance with the present disclosure.

Figure 5B:
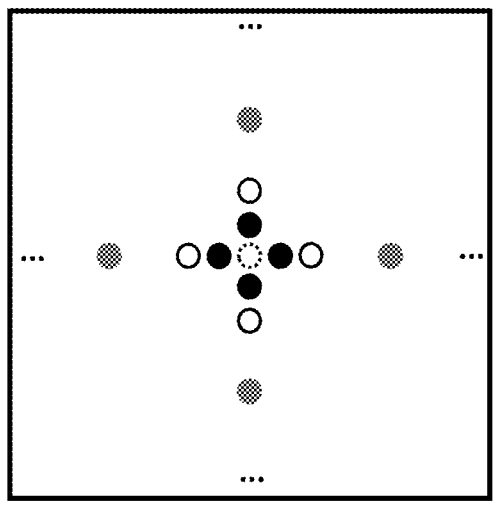
FIG. 5B is a diagram illustrating an MMVD search point, according to an example of the present disclosure.

FIG. 5B shows a diagram illustrating an MMVD search point for second list (L1) reference in accordance with the present disclosure.

Affine Motion Compensated Prediction

Figure 6A:
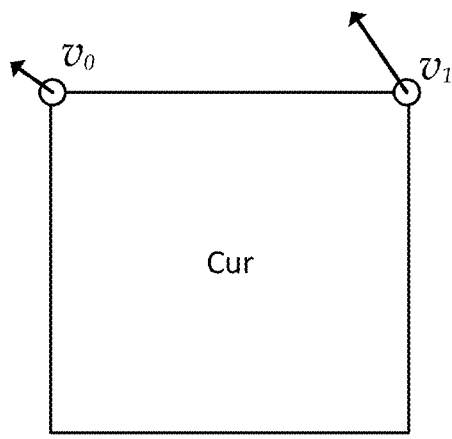
FIG. 6A is a control point based affine motion model, according to an example of the present disclosure.
Figure 6B:
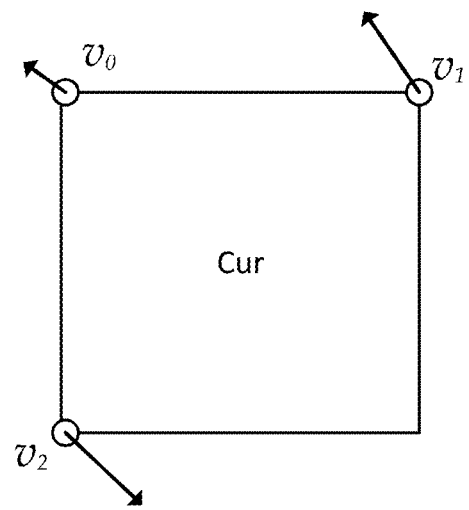
FIG. 6B is a control point based affine motion model, according to an example of the present disclosure.

In HEVC, only translation motion model is applied for motion compensation prediction (MCP). While in the real world, there are many kinds of motion, e.g. zoom in/out, rotation, perspective motions, and the other irregular motions. In the VTM3, a block-based affine transform motion compensation prediction is applied. As shown in FIGS. 6A and 6B (described below), the affine motion field of the block is described by motion information of two control point (4-parameter) or three control point motion vectors (6-parameter).

FIG. 6A shows a control point based affine motion model for a 4-parameter affine model in accordance with the present disclosure.

FIG. 6B shows a control point based affine motion model for a 6-parameter affine model in accordance with the present disclosure.

For 4-parameter affine motion model, motion vector at sample location (x, y) in a block is derived as:

$$\begin{cases} mv_x = \dfrac{mv_{1x} - mv_{0x}}{w}x + \dfrac{mv_{1y} - mv_{0y}}{w}y + mv_{0x} \\ mv_y = \dfrac{mv_{1y} - mv_{0y}}{w}x + \dfrac{mv_{1y} - mv_{0x}}{w}y + mv_{0y} \end{cases}$$

For 6-parameter affine motion model, motion vector at sample location (x, y) in a block is derived as:

$$\begin{cases} mv_x = \dfrac{mv_{1x} - mv_{0x}}{w}x + \dfrac{mv_{2x} - mv_{0x}}{H}y + mv_{0x} \\ mv_y = \dfrac{mv_{1y} - mv_{0y}}{w}x + \dfrac{mv_{2y} - mv_{0y}}{H}y + mv_{0y} \end{cases}$$

Where ($mv_{0x}$, $mv_{0y}$) is motion vector of the top-left corner control point, ($mv_{1x}$, $mv_{1y}$) is motion vector of the top-right corner control point, and ($mv_{2x}$, $mv_{2y}$) is motion vector of the bottom-left corner control point.

Figure 7:
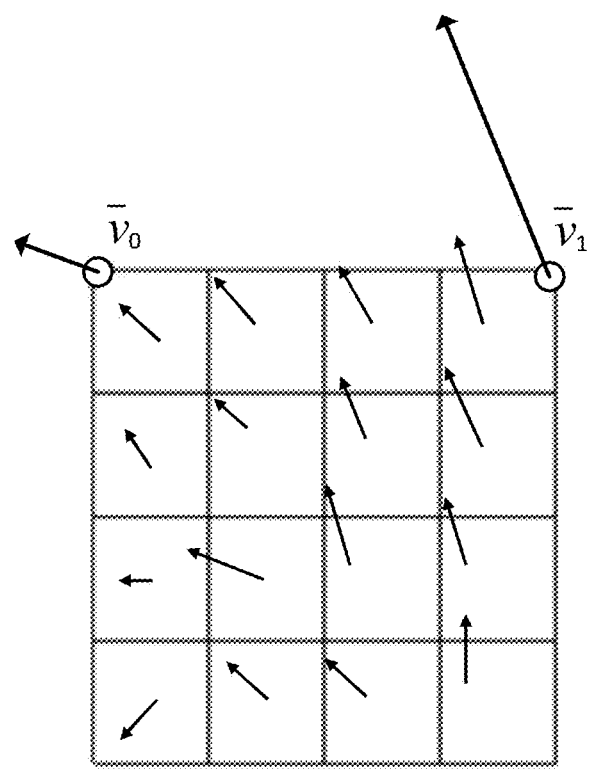
FIG. 7 is a diagram illustrating an affine motion vector field (MVF) per sub-block, according to an example of the present disclosure.

In order to simplify the motion compensation prediction, block based affine transform prediction is applied. To derive motion vector of each 4×4 luma sub-block, the motion vector of the center sample of each sub-block, as shown in FIG. 7 (described below), is calculated according to above equations, and rounded to 1/16 fraction accuracy. Then the motion compensation interpolation filters are applied to generate the prediction of each sub-block with derived motion vector. The sub-block size of chroma-components is also set to be 4×4. The MV of a 4×4 chroma sub-block is calculated as the average of the MVs of the four corresponding 4×4 luma sub-blocks.

FIG. 7 shows an affine motion vector field (MVF) per sub-block in accordance to the present disclosure.

As done for translational motion inter prediction, there are also two affine motion inter prediction modes: affine merge mode and affine AMVP mode.

Affine Merge Prediction

Figure 8:
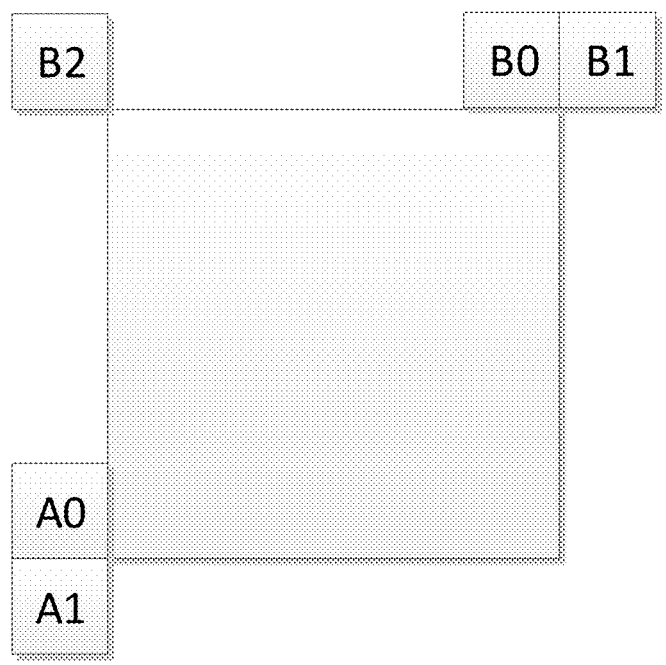
FIG. 8 is a diagram illustrating locations of inherited affine motion predictors, according to an example of the present disclosure.
Figure 9:
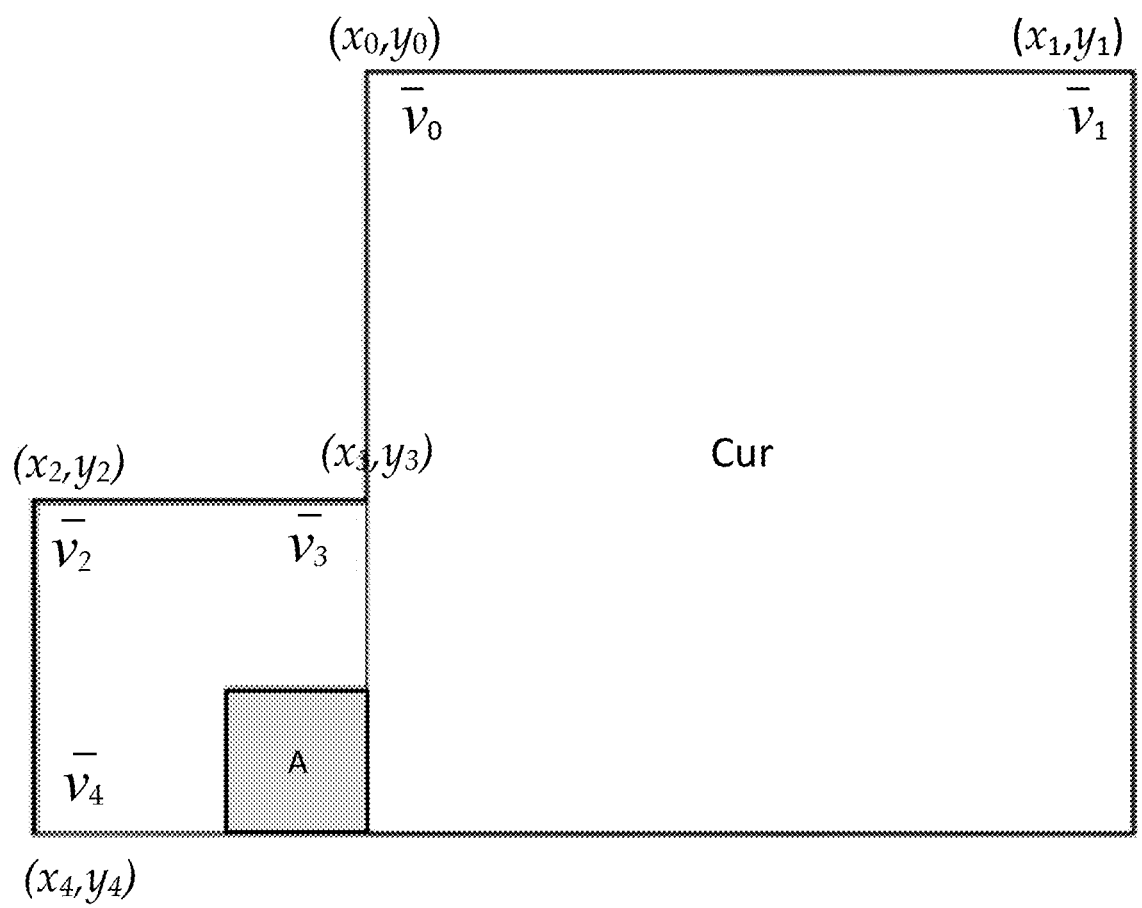
FIG. 9 is a diagram illustrating control point motion vector inheritance, according to an example of the present disclosure.

AF_MERGE mode can be applied for CUs with both width and height larger than or equal to 8. In this mode the CPMVs of the current CU is generated based on the motion information of the spatial neighboring CUs. There can be up to five CPMVP candidates and an index is signalled to indicate the one to be used for the current CU. The following three types of CPVM candidate are used to form the affine merge candidate list:

6. Inherited affine merge candidates that extrapolated from the CPMVs of the neighbor CUs
7. Constructed affine merge candidates CPMVPs that are derived using the translational MVs of the neighbor CUs
8. Zero MVs In VTM3, there are maximum two inherited affine candidates, which are derived from affine motion model of the neighboring blocks, one from left neighboring CUs and one from above neighboring CUs. The candidate blocks are shown in FIG. 8 (described below). For the left predictor, the scan order is A0->A1, and for the above predictor, the scan order is B0->B1->B2. Only the first inherited candidate from each side is selected. No pruning check is performed between two inherited candidates. When a neighboring affine CU is identified, its control point motion vectors are used to derived the CPMVP candidate in the affine merge list of the current CU. As shown in FIG. 9 (described below), if the neighbour left bottom block A is coded in affine mode, the motion vectors $v_2$, $v_3$ and $v_4$ of the top left corner, above right corner and left bottom corner of the CU which contains the block A are attained. When block A is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

FIG. 8 shows the locations of inherited affine motion predictors in accordance with the present disclosure.

FIG. 9 shows a control point motion vector inheritance in accordance with the present disclosure.

Constructed affine candidate means the candidate is constructed by combining the neighbor translational motion information of each control point. The motion information for the control points is derived from the specified spatial neighbors and temporal neighbor shown in FIG. 10 (described below). $CPMV_k$ (k=1, 2, 3, 4) represents the k-th control point. For $CPMV_1$, the B2->B3->A2 blocks are checked and the MV of the first available block is used. For $CPMV_2$, the B1->B0 blocks are checked and for $CPMV_3$, the A1->A0 blocks are checked. For TMVP is used as $CPMV_4$ if it's available.

Figure 10:
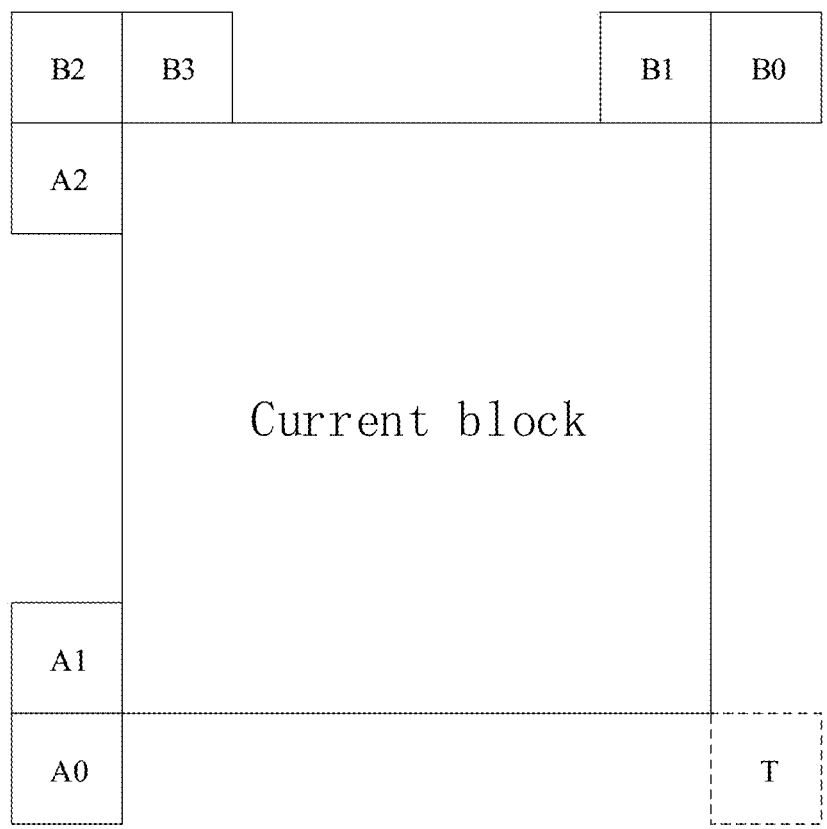
FIG. 10 is a diagram illustrating the location of candidates' positions, according to an example of the present disclosure.

FIG. 10 shows the locations of candidates' position for constructed affine merge mode in accordance with the present disclosure.

After MVs of four control points are attained, affine merge candidates are constructed based on corresponding motion information. The following combinations of control point MVs are used to construct in order:

{$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

Subblock-Based Temporal Motion Vector Prediction (SbTMVP)

VTM supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTVMP. SbTMVP differs from TMVP in the following two main aspects:

1. TMVP predicts motion at CU level but SbTMVP predicts motion at sub-CU level;
2. Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 11:
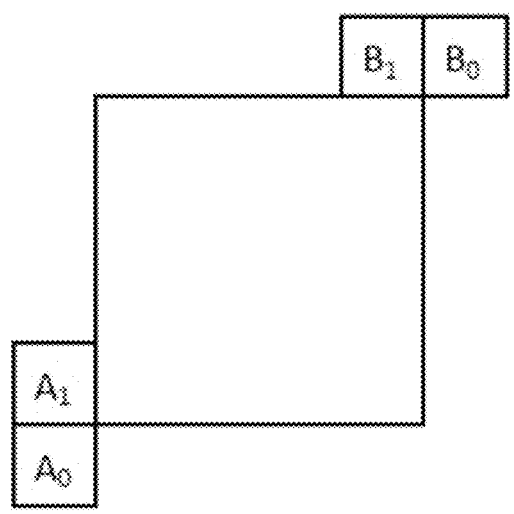
FIG. 11 is a diagram illustrating spatial neighboring blocks used by subblock based temporal motion vector prediction (SbTMVP), according to an example of the present disclosure.
Figure 12B:
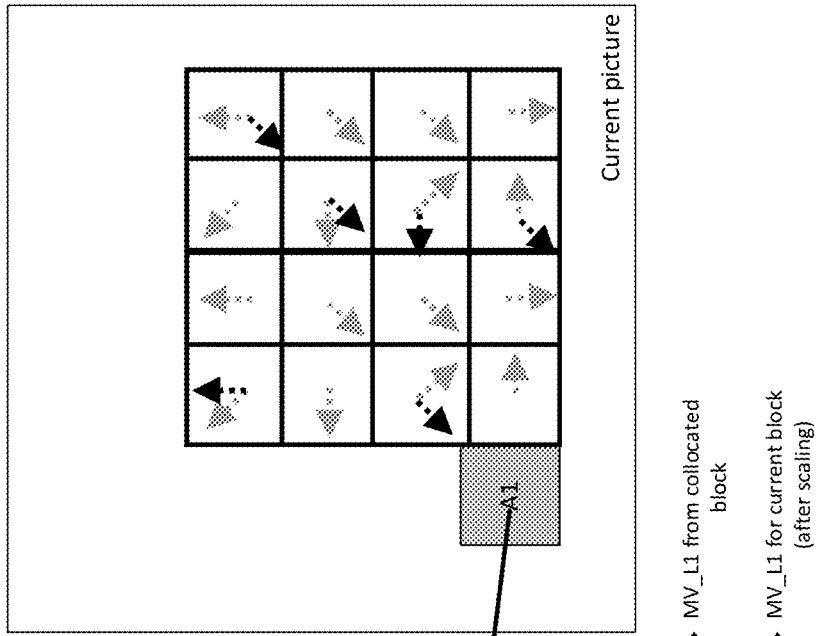
FIG. 12B is a diagram illustrating a subblock-based temporal motion vector prediction (SbTMVP) process, according to an example of the present disclosure.
Figure 12A:
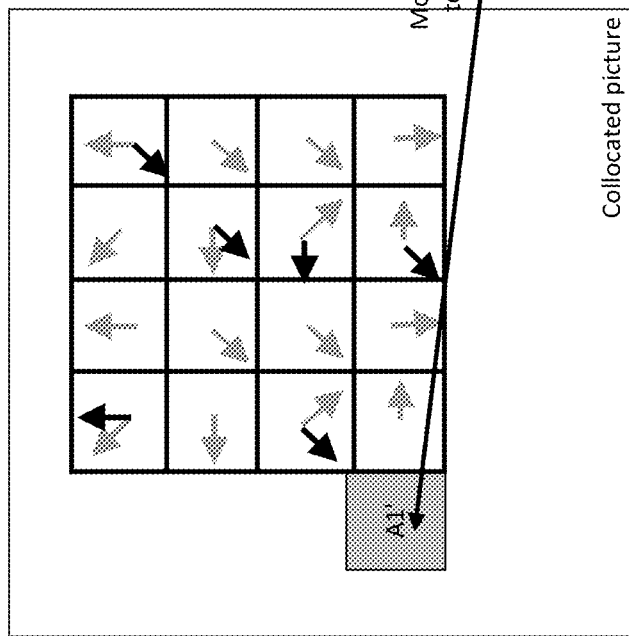
FIG. 12A is a diagram illustrating a subblock-based temporal motion vector prediction (SbTMVP) process, according to an example of the present disclosure.

The SbTVMP process is illustrated in FIG. 11, FIG. 12A, and FIG. 12B (described below). SbTMVP predicts the motion vectors of the sub-CUs within the current CU in two steps. In the first step, the spatial neighbors in FIG. 11 are examined in the order of A1, B1, B0 and A0. As soon as and the first spatial neighboring block that has a motion vector that uses the collocated picture as its reference picture is identified, this motion vector is selected to be the motion shift to be applied. If no such motion is identified from the spatial neighbors, then the motion shift is set to (0, 0).

FIG. 11 shows spatial neighboring blocks used by sub-block based temporal motion vector prediction (SbTMVP). SbTMVP is also known as alternative temporal motion vector prediction (ATMVP).

In the second step, the motion shift identified in Step 1 is applied (i.e., added to the current block's coordinates) to obtain sub-CU-level motion information (motion vectors and reference indices) from the collocated picture as shown in FIGS. 12A and 12B. The example in FIGS. 12A and 12B assumes the motion shift is set to block A1's motion. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

FIG. 12A shows the SbTMVP process in VVC for the collocated picture, when deriving sub-CU motion field by applying a motion shift from spatial neighbor and scaling the motion information from the corresponding collocated sub-CUs.

FIG. 12B shows the SbTMVP process in VVC for the current picture, when deriving sub-CU motion field by applying a motion shift from spatial neighbor and scaling the motion information from the corresponding collocated sub-CUs.

In VTM3, a combined sub-block based merge list which contains both SbTVMP candidate and affine merge candidates is used for the signalling of sub-block based merge mode. In the following context, subblock merge mode is used. The SbTVMP mode is enabled/disabled by a sequence parameter set (SPS) flag. If the SbTMVP mode is enabled, the SbTMVP predictor is added as the first entry of the list of sub-block based merge candidates, and followed by the affine merge candidates. The size of sub-block based merge list is signalled in SPS and the maximum allowed size of the sub-block based merge list is 5 in VTM3.

The sub-CU size used in SbTMVP is fixed to be 8×8, and as done for affine merge mode, SbTMVP mode is only applicable to the CU with both width and height are larger than or equal to 8.

The encoding logic of the additional SbTMVP merge candidate is the same as for the other merge candidates, that is, for each CU in P or B slice, an additional RD check is performed to decide whether to use the SbTMVP candidate.

Combined Inter and Intra Prediction (CIIP)

In VTM3, when a CU is coded in merge mode, and if the CU contains at least 64 luma samples (that is, CU width times CU height is equal to or larger than 64), an additional flag is signaled to indicate if the combined inter/intra prediction (CIIP) mode is applied to the current CU.

In order to form the CIIP prediction, an intra prediction mode is first derived from two additional syntax elements. Up to four possible intra prediction modes can be used: DC, planar, horizontal, or vertical. Then, the inter prediction and intra prediction signals are derived using regular intra and inter decoding processes. Finally, weighted averaging of the inter and intra prediction signals is performed to obtain the CIIP prediction.

Intra Prediction Mode Derivation

Up to 4 intra prediction modes, including DC, PLANAR, HORIZONTAL, and VERTICAL modes, can be used to predict the luma component in the CIIP mode. If the CU shape is very wide (that is, width is more than two times of height), then the HORIZONTAL mode is not allowed. If the CU shape is very narrow (that is, height is more than two times of width), then the VERTICAL mode is not allowed. In these cases, only 3 intra prediction modes are allowed.

The CIIP mode uses 3 most probable modes (MPM) for intra prediction. The CIIP MPM candidate list is formed as follows:

The left and top neighbouring blocks are set as A and B, respectively

The intra prediction modes of block A and block B, denoted as intraModeA and intraModeB, respectively, are derived as follows:

Let X be either A or B intraModeX is set to DC if 1) block X is not available; or 2) block X is not predicted using the CIIP mode or the intra mode; 3) block B is outside of the current CTU otherwise, intraModeX is set to 1) DC or PLANAR if the intra prediction mode of block X is DC or PLANAR; or 2) VERTICAL if the intra prediction mode of block X is a "vertical-like" angular mode (larger than 34), or 3) HORIZONTAL if the intra prediction mode of block X is a "horizontal-like" angular mode (smaller than or equal to 34)

If intraModeA and intraModeB are the same:

If intraModeA is PLANAR or DC, then the three MPMs are set to {PLANAR, DC, VERTICAL} in that order Otherwise, the three MPMs are set to {intraModeA, PLANAR, DC} in that order Otherwise (intraModeA and intraModeB are different):

The first two MPMs are set to {intraModeA, intraModeB} in that order

Uniqueness of PLANAR, DC and VERTICAL is checked in that order against the first two MPM candidate modes; as soon as a unique mode is found, it is added to as the third MPM If the CU shape is very wide or very narrow as defined above, the MPM flag is inferred to be 1 without signaling. Otherwise, an MPM flag is signaled to indicate if the CIIP intra prediction mode is one of the CIIP MPM candidate modes.

If the MPM flag is 1, an MPM index is further signaled to indicate which one of the MPM candidate modes is used in CIIP intra prediction. Otherwise, if the MPM flag is 0, the intra prediction mode is set to the "missing" mode in the MPM candidate list. For example, if the PLANAR mode is not in the MPM candidate list, then PLANAR is the missing mode, and the intra prediction mode is set to PLANAR. Since 4 possible intra prediction modes are allowed in CIIP, and the MPM candidate list contains only 3 intra prediction modes, one of the 4 possible modes must be the missing mode.

For the chroma components, the DM mode is always applied without additional signaling; that is, chroma uses the same prediction mode as luma.

The intra prediction mode of a CIIP-coded CU will be saved and used in the intra mode coding of the future neighboring CUs.

Combining the Inter and Intra Prediction Signals

The inter prediction signal in the CIIP mode $P_{inter}$ derived using the same inter prediction process applied to regular merge mode; and the intra prediction signal $P_{intra}$ is derived using the CIIP intra prediction mode following the regular intra prediction process. Then, the intra and inter prediction signals are combined using weighted averaging, where the weight value depends on the intra prediction mode and where the sample is located in the coding block, as follows:

If the intra prediction mode is the DC or planar mode, or if the block width or height is smaller than 4, then equal weights are applied to the intra prediction and the inter prediction signals.

Otherwise, the weights are determined based on the intra prediction mode (either horizontal mode or vertical mode in this case) and the sample location in the block. Take the horizontal prediction mode for example (the weights for the vertical mode are derived similarly but in the orthogonal direction). Denote W as the width of the block and H as the height of the block. The coding block is first split into four equal-area parts, each of the dimension (W/4)×H. Starting from the part closest to the intra prediction reference samples and ending at the part farthest away from the intra prediction reference samples, the weight wt for each of the 4 regions is set to 6, 5, 3, and 2, respectively. The final CIIP prediction signal is derived using the following:

$$P_{CIIP}=((8-wt)*P_{inter}+wt*P_{intra})>>3$$

Triangle Partition for Inter Prediction

In VTM3, a new triangle partition mode is introduced for inter prediction. The triangle partition mode is only applied to CUs that are 8×8 or larger and are coded in skip or merge mode. For a CU satisfying these conditions and merge flag is on, a CU-level flag is signaled to indicate whether the triangle partition mode is applied or not.

Figure 13A:
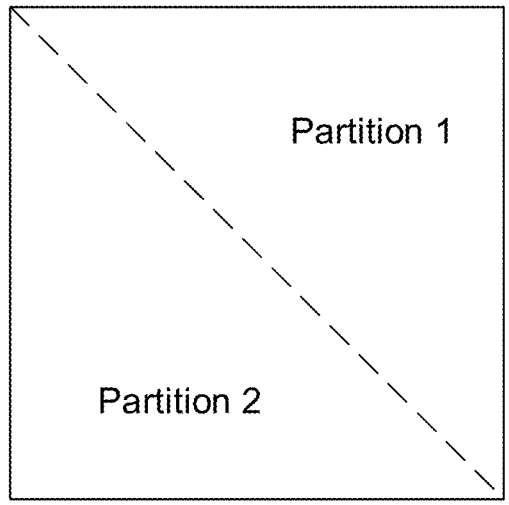
FIG. 13A is a diagram illustrating a triangle partition, according to an example of the present disclosure.
Figure 13B:
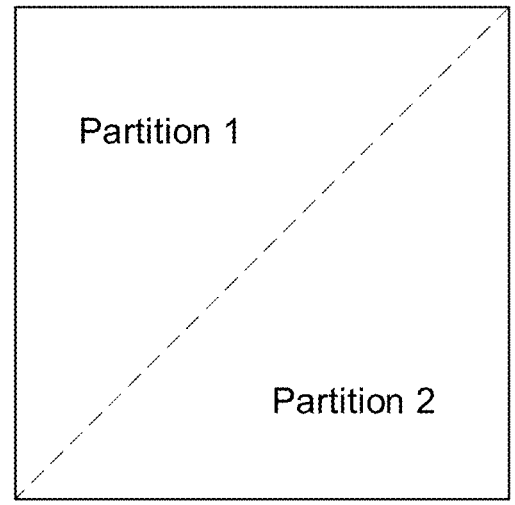
FIG. 13B is a diagram illustrating a triangle partition, according to an example of the present disclosure

When this mode is used, a CU is split evenly into two triangle-shaped partitions, using either the diagonal split or the anti-diagonal split (FIG. 13A and FIG. 13B, described below). Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU.

If the CU-level flag indicates that the current CU is coded using the triangle partition mode, an index in the range of [0, 39] is further signaled. Using this triangle partition index, the direction of the triangle partition (diagonal or anti-diagonal), as well as the motion for each of the partitions can be obtained through a look-up table. After predicting each of the triangle partitions, the sample values along the diagonal or anti-diagonal edge are adjusted using a blending processing with adaptive weights. This is the prediction signal for the whole CU, and transform and quantization process will be applied to the whole CU as in other prediction modes. Finally, the motion field of a CU predicted using the triangle partition mode is stored in 4×4 units.

FIG. 13A shows a triangle partition based inter prediction in accordance to the present disclosure.

FIG. 13B shows a triangle partition based inter prediction in accordance to the present disclosure.

Context-Adaptive Binary Arithmetic Coding (CABAC)

Context-adaptive binary arithmetic coding (CABAC) is a form of entropy encoding used in the H.264/MPEG-4 AVC and High Efficiency Video Coding (HEVC) standards and VVC. CABAC is based on arithmetic coding, with a few innovations and changes to adapt it to the needs of video encoding standards:

It encodes binary symbols, which keeps the complexity low and allows probability modelling for more frequently used bits of any symbol.

The probability models are selected adaptively based on local context, allowing better modelling of probabilities, because coding modes are usually locally well correlated.

It uses a multiplication-free range division by the use of quantized probability ranges and probability states.

CABAC has multiple probability modes for different contexts. It first converts all non-binary symbols to binary. Then, for each bin (or termed bit), the coder selects which probability model to use, then uses information from nearby elements to optimize the probability estimate. Arithmetic coding is finally applied to compress the data.

The context modeling provides estimates of conditional probabilities of the coding symbols. Utilizing suitable context models, a given inter-symbol redundancy can be exploited by switching between different probability models according to already-coded symbols in the neighborhood of the current symbol to encode.

Coding a data symbol involves the following stages.

Binarization: CABAC uses Binary Arithmetic Coding which means that only binary decisions (1 or 0) are encoded. Anon-binary-valued symbol (e.g. a transform coefficient or motion vector) is "binarized" or converted into a binary code prior to arithmetic coding. This process is similar to the process of converting a data symbol into a variable length code but the binary code is further encoded (by the arithmetic coder) prior to transmission.

Stages are repeated for each bin (or "bit") of the binarized symbol.

Context model selection: A "context model" is a probability model for one or more bins of the binarized symbol. This model may be chosen from a selection of available models depending on the statistics of recently coded data symbols. The context model stores the probability of each bin being "1" or "0".

Arithmetic encoding: An arithmetic coder encodes each bin according to the selected probability model. Note that there are just two sub-ranges for each bin (corresponding to "0" and "1").

Probability update: The selected context model is updated based on the actual coded value (e.g. if the bin value was "1", the frequency count of "1"s is increased).

Figure 14:
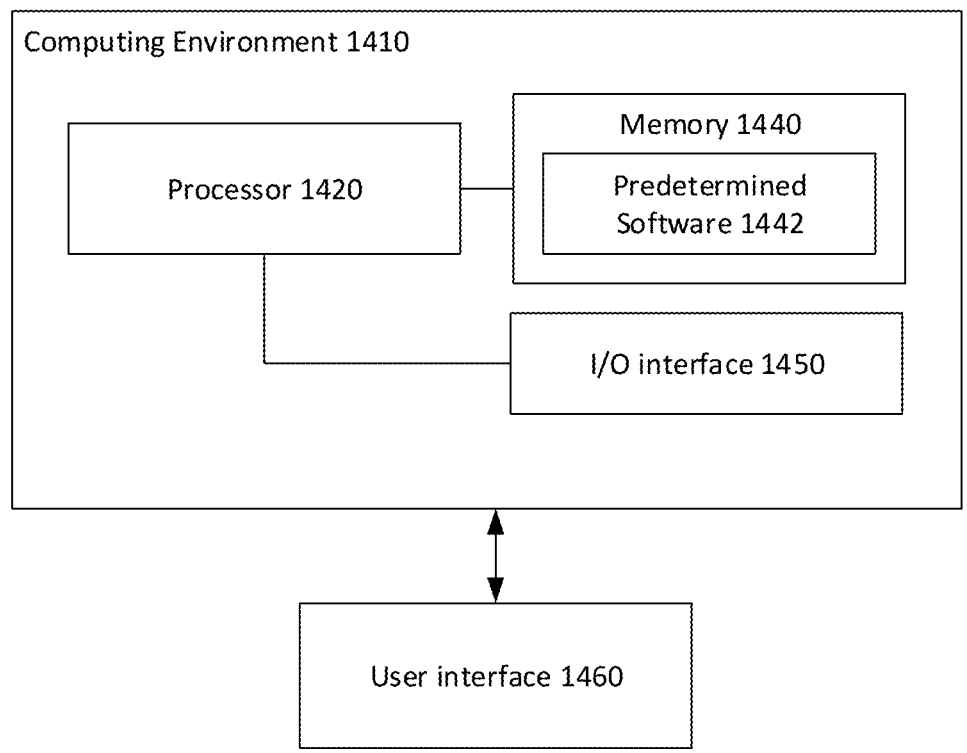
FIG. 14 is a diagram illustrating a computing environment coupled with a user interface, according to an example of the present disclosure.

FIG. 14 shows a computing environment 1410 coupled with a user interface 1460. Computing environment 1410 can be part of data processing server. Computing environment 1410 includes processor 1420, memory 1440, and I/O interface 1450.

The processor 1420 typically controls overall operations of the computing environment 1410, such as the operations associated with the display, data acquisition, data communications, and image processing. The processor 1420 may include one or more processors to execute instructions to perform all or some of the steps in the above-described methods. Moreover, the processor 1420 may include one or more modules that facilitate the interaction between the processor 1420 and other components. The processor may be a Central Processing Unit (CPU), a microprocessor, a single chip machine, a GPU, or the like.

The memory 1440 is configured to store various types of data to support the operation of the computing environment 1410. Examples of such data comprise instructions for any applications or methods operated on the computing environment 1410, MRI datasets, image data, etc. The memory 1440 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1450 provides an interface between the processor 1420 and peripheral interface modules, such as a keyboard, a click wheel, buttons, and the like. The buttons may include but are not limited to, a home button, a start scan button, and a stop scan button. The I/O interface 1450 can be coupled with an encoder and decoder.

In an embodiment, there is also provided a non-transitory computer-readable storage medium comprising a plurality of programs, such as comprised in the memory 1440, executable by the processor 1420 in the computing environment 1410, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, wherein the plurality of programs, when executed by the one or more processors, cause the computing device to perform the above-described method for motion prediction.

In an embodiment, the computing environment 1410 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

Methods in Accordance With the Present Disclosures

As described above, in VTM-3.0, the merge modes are further classified into five categories including the regular merge, merge mode with MVD (MMVD), subblock merge (containing affine merge and subblock-based temporal motion vector prediction), combined inter and intra prediction (CIIP) merge and triangle partition merge. The syntax of the merge mode signaling in current VVC is illustrated in the table below.

TABLE 3

Syntax of merge related modes in current VVC

| merge data( x0, y0, cbWidth, cbHeight) { | Descriptor |
|---|---|
| mmvd_flag[ x0 ][ y0 ] | ae(v) |
| if( mmvd_flag[ x0 ][ y0 ] = = 1) { | |
|   mmvd_merge_flag[ x0 ][ y0 ] | ae(v) |
|   mmvd_distance_idx[ x0 ][ y0 ] | ae(v) |
|   mmvd_direction_idx[ x0 ][ y0 ] | ae(v) |
| } else { | |
|   if( MaxNumSubblockMergeCand > 0 && cbWidth >= 8 && cbHeight >= 8 ) | |
|     merge_subblock_flag[ x0 ][ y0 ] | ae(v) |
|   if( merge_subblock_flag[ x0 ][ y0 ] = = 1) { | |
|     if( MaxNumSubblockMergeCand > 1) | |
|       merge_subblock_idx[ x0 ][ y0 ] | ae(v) |
| } else { | |
|   if( sps_mh_intra_enabled_flag && cu_skip_flag[ x0 ][ y0 ] = = 0 && | |
|     ( cbWidth * cbHeight) >= 64 && cbWidth < 128 && cbHeight < 128) { | |
|     mh_intra_flag[ x0 ][ y0 ] | ae(v) |
|     if( mh_intra_flag[ x0 ][ y0 ]) { | |
|       if ( cbWidth <= 2 * cbHeight | | cbHeight <= 2 * cbWidth) | |
|         mh_intra_luma_mpm_flag[ x0 ][ y0 ] | ae(v) |
|       if( mh_intra_luma_mpm_flag[ x0 ][ y0 ]) | |
|         mh_intra_luma_mpm_idx[ x0 ][ y0 ] | ae(v) |
|     } | |
|   } | |
|   if( sps_triangle_enabled_flag && slice_type = = B && cbWidth * cbHeight >= 16) | |
|     merge_triangle_flag[ x0 ][ y0 ] | ae(v) |
|   if( merge_triangle_flag[ x0 ][ y0 ]) | |
|     merge_triangle_idx[ x0 ][ y0 ] | ae(v) |
|   else if( MaxNumMergeCand > 1) | |
|     merge_idx[ x0 ][ y0 ] | ae(v) |
|   } | |
|  } | |
| } | |

To summarize, in current VVC, the syntax (the associated flags) signaled to indicate the corresponding merge modes is illustrated as below.

TABLE 4

The signaling of the merge related modes in current VVC

| | MMVD Flag | Subblock Flag | CIIP Flag | Triangular Flag |
|---|---|---|---|---|
| MMVD | 1 | — | — | — |
| Subblock | 0 | 1 | — | — |
| CIIP | 0 | 0 | 1 | — |
| Triangle | 0 | 0 | 0 | 1 |
| Regular | 0 | 0 | 0 | 0 |

It is observed that more than 50% of the merge modes are the regular merge modes. However, in VTM-3.0, the codeword for the regular merge mode is the longest one among the five different merge modes, which is not an efficient design in terms of syntax parsing. In current VVC, Skip mode has similar syntax design as the merge mode except that no CIIP mode for Skip. However, the same observation was made in skip modes.

Syntax for the Regular Merge

As mentioned above, the scheme of the regular merge mode in current VVC is used the most frequently among the several merge related modes including (regular merge, MMVD, subblock merge, CIIP and triangle merge). In an embodiment of the present disclosure, signal an explicit flag for the regular merge mode to indicate whether the regular merge mode is used or not. As shown in the table below, one Regular Flag (or termed Regular merge flag) is explicitly signaling into the bitstream and all the signaling of the related flags are modified accordingly. The regular merge flag is context coded using the CABAC. In one scheme, only one context is used to code the regular merge flag. In yet another scheme, multiple context models are used to code the regular merge flag and the selection of the context model is based on the coded information such as the regular merge flags of the neighboring blocks, or the size of current CU.

TABLE 5

An example of signaling of the merge related modes in the proposed scheme

| | Regular Flag | MMVD Flag | Subblock Flag | CIIP Flag |
|---|---|---|---|---|
| Regular | 1 | — | — | — |
| MMVD | 0 | 1 | — | — |
| Subblock | 0 | 0 | 1 | — |
| CIIP | 0 | 0 | 0 | 1 |
| Triangle | 0 | 0 | 0 | 0 |

In current VVC, the constraints for enabling the merge related modes are different and therefore the signaling the flags of each merge related mode are also different as summarized below.

TABLE 6

Constrains of enabling/signaling the merge related modes

| | constraints |
|---|---|
| Regular | no constraints |
| MMVD | no constraints |
| Subblock | block with >8 and block height >8 |
| CIIP | (block width × block height) >=64 && block width !=128 && block height !=128 |
| Triangle | (block width × block height) >=64 |

Therefore, the signaling of the regular merge flag should also consider the different constraints applied to each flag signaling. For example, when the block size is 4×4, 8×4 or 4×8, only regular merge mode and the MMVD are valid. In these conditions (the block size is 4×4, 8×4 or 4×8), only regular merge flag is signaled; when regular merge flag is equal to 1, the regular merge mode is used; otherwise when the regular merge flag is equal to 0, the MMVD is used. An example of the syntax based on the current VVC working draft is illustrated below.

TABLE 7

An example of syntax in the proposed scheme

| merge data( x0, y0, cbWidth, cbHeight) { | Descriptor |
|---|---|
|   regular_merge_flag[ x0 ][ y0 ] | ae(v) |
|   if( !(cbWidth = = 4 && cbHeight = = 4 ) && !(cbWidth = = 8 && cbHeight = = 4 ) | |
|     && !(cbWidth = = 4 && cbHeight = = 8 ) | |
| && !regular_merge_flag[ x0 ][ y0 ]) | |
|   { | |
|   mmvd_flag[ x0 ][ y0 ] | ae(v) |
|   if( mmvd_flag[ x0 ][ y0 ] = = 1) { | |
|     mmvd_merge_flag[ x0 ][ y0 ] | ae(v) |
|     mmvd_distance_idx[ x0 ][ y0 ] | ae(v) |
|     mmvd_direction_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|       if( merge_subblock_flag[ x0 ][ y0 ] = = 1) { | |
|         if( MaxNumSubblockMergeCand > 1) | |
|           merge_subblock_idx[ x0 ][ y0 ] | ae(v) |
|     } else { | |
|       if( sps_mh_intra_enabled_flag && cu_skip_flag[ x0 ][ y0 ] = = 0 && | |
|         ( cbWidth * cbHeight) >= 64 && cbWidth < 128 && cbHeight < 128) { | |
|         mh_intra_flag[ x0 ][ y0 ] | ae(v) |
|         if( mh_intra_flag[ x0 ][ y0 ]) { | |
|           if ( cbWidth <= 2 * cbHeight \|\| cbHeight <= 2 * cbWidth) | |

TABLE 7-continued

An example of syntax in the proposed scheme

| merge data( x0, y0, cbWidth, cbHeight) { | Descript or |
|---|---|
|     mh_intra_luma_mpm_flag[ x0 ][ y0 ] | ae(v) |
|     if( mh_intra_luma_mpm_flag[ x0 ][ y0 ] ) | |
|         mh_intra_luma_mpm_idx[ x0 ][ y0 ] | ae(v) |
|    } | |
| } | |
| merge_triangle_flag[ x0 ][ y0 ] = | |
| !regular_merge_flag[ x0 ][ y0 ] && !mmvd_flag[ x0 ][ y0 ] | |
| && !merge_subblock_flag[ x0 ][ y0 ] && !mh_intra_flag[ x0 ][ y0 ] | |
| ~~if( sps_triangle_enabled_flag && slice_type == B && cbWidth * cbHeight >= 16)~~ | |
| ~~merge_triangle_flag[ x0 ][ y0 ]~~ | ~~ae(v)~~ |
| if( merge_triangle_flag[ x0 ][ y0 ]) | |
|     merge_triangle_idx[ x0 ][ y0 ] | ae(v) |
| else if( MaxNumMergeCand > 1) | |
|     merge_idx[ x0 ][ y0 ] | ae(v) |
|    } | |
|   } | |
| } | |

In the example, it is noted that, the regular merge flag is explicitly signaled into the bitstream. However, regular merge flag may be signaled in any position and does not have to be the first position as described above. In yet another scheme, the regular merge flag is signaled but is signaled after the MMVD and subblock merge flags.

Integrate Related Merge Modes Into the Regular Merge Mode

In an embodiment of the present disclosure, the MMVD, CIIP, and triangle merge into the regular merge mode. In this scheme, all the MMVD candidates, CIIP candidates, and triangle merge candidates are regarded as the regular merge candidates and the regular merge index are utilized to indicate which candidate is used. The size of the regular merge candidate list is thus needed to be enlarged accordingly. In one example, the regular merge index equal to N (N could be any positive integer and is smaller than the maximum size of the regular merge candidate list) means the MMVD mode is selected and further syntax are signaled/received to indicate which MMVD candidate is used. Same scheme is also applied to CIIP and triangle merge modes.

In yet another example, the CIIP and triangle merge into the regular merge mode. In this scheme, all the CIIP candidates and triangle merge candidates are regarded as the regular merge candidates and the regular merge index are utilized to indicate which candidate is used. The size of the regular merge candidate list is thus needed to be enlarged accordingly.

Constraints Alignment

As mentioned above, the constraints of enabling the different merge related modes are different. In an embodiment of the present disclosure, the constraints of enabling the different merge modes and signaling the related flags are more aligned. In one example, the constraints are modified as illustrated in the table below.

TABLE 8

Modified constrains of enabling/signaling the merge related modes

| | constraints |
|---|---|
| Regular | no constraints |
| MMVD | no constraints |
| Subblock | block with >8 and block height >8 |
| CIIP | block with >8 and block height >8 && block width !=128 && block height !=128 |
| Triangle | block with >8 and block height >8 |

In yet another example of the present disclosure, the conditions are modified as illustrated in the table below.

TABLE 9

Modified constrains of enabling/signaling the merge related modes

| | constraints |
|---|---|
| Regular | no constraints |
| MMVD | no constraints |
| Subblock | block with >8 and block height >8 && block width !=128 && block height !=128 |
| CIIP | block with >8 and block height >8 && block width !=128 && block height !=128 |
| Triangle | block with >8 and block height >8 && block width !=128 && block height !=128 |

In yet another example of the present disclosure, the conditions are modified as illustrated in the table below. In this scheme, it is noted that the flag of the CIIP is still signaled when block width=128 or block height=128, it is constrained to be always zero when block width=128 or block height=128 because intra prediction does not support these conditions.

TABLE 10

Modified constrains of enabling/signaling the merge related modes

| | constraints |
|---|---|
| Regular | no constraints |
| MMVD | no constraints |

TABLE 10-continued

Modified constrains of enabling/signaling the merge related modes

| | constraints |
|---|---|
| Subblock | block with >8 and block height >8 |
| CIIP | block with >8 and block height >8 |
| Triangle | block with >8 and block height >8 |

In yet another example of the present disclosure, the conditions are modified as illustrated in the table below. In this scheme, it is noted that the flag of the CIIP is still signaled when block width=128 or block height=128, it is constrained to be always zero when block width=128 or block height=128 because intra prediction does not support these conditions.

TABLE 11

Modified constrains of enabling/signaling the merge related modes

| | constraints |
|---|---|
| Regular | no constraints |
| MMVD | no constraints |
| Subblock | block with >8 and block height >8 |
| CIIP | (block width × block height) >=64 |
| Triangle | (block width × block height) >=64 |

Switching the Order of the CIIP Flag and Triangle Merge Flag

Switching the signaling order of CIIP flag and triangle merge flag because it is observed that triangle merge mode is used more often.

What is claimed is:

1. A computer implemented method for motion merge modes, comprising:
    acquiring, from a decoder, a regular merge flag for a coding unit (CU) that is coded as merge mode and merge related modes;
    when the regular merge flag is one, indicating that a regular merge mode or merge mode with motion vector differences (MMVD) is used by the CU, constructing a single merge list for the CU, wherein the single merge list comprises regular motion vector candidates and MMVD motion vector candidates selected by a regular merge index to indicate which candidate is used, wherein the single merge list is constructed for both the regular merge mode and the MMVD; and
    when the regular merge flag is zero, indicating the regular merge mode is not used by the CU, and further receiving mode flags to indicate associated merge related modes are used when a mode flag's constraints are met.

2. The method of claim 1, further comprising:
    receiving, by the decoder, a MMVD merge flag, MMVD distance index, and MMVD direction index when MMVD flag is equal to one.

3. The method of claim 1, further comprising receiving subblock flag and the subblock flag's constraints includes:
    acquiring a coding block from a decoder, wherein the coding block has a width and height;
    determining, by the decoder, whether maximum number of subblock-based merging MVP candidates (MaxNumSubblockMergeCand) is greater than zero;
    determining, by the decoder, whether coding block width is greater than equal to eight; and
    determining, by the decoder, whether coding block height is greater than equal to eight.

4. The method of claim 1, wherein the mode flag is a combined inter and intra prediction (CIIP) flag and the CIIP flag's constraints include:
    acquiring a coding block from a decoder, wherein the coding block has a width and height;
    determining, by the decoder, whether sps_mh_intra_enabled_flag is set;
    determining, by the decoder, whether cu_skip_flag is equal to zero;
    determining, by the decoder, whether the coding block width times the coding block height is greater than equal to sixty-four;
    determining, by the decoder, whether coding block width is less than one hundred and twenty-eight; and
    determining, by the decoder, whether coding block height is less than one hundred and twenty-eight.

5. The method of claim 1, further comprising:
    receiving, by the decoder, a regular merge flag before receiving, by the decoder, the mode flag when the mode flag's constraints are met.

6. The method of claim 5, further comprising:
    receiving, by the decoder, a regular merge flag before receiving, by the decoder, a merge mode with motion vector differences (MMVD) flag when the merge mode with motion vector differences (MMVD) flag's constraints are met.

7. The method of claim 5, further comprising:
    receiving, by the decoder, a regular merge flag before receiving, by the decoder, a combined inter and intra prediction (CIIP) flag when the CIIP flag's constraints are met.

8. The method of claim 1, further comprising:
    receiving, by the decoder, a regular merge flag after receiving, by the decoder, a mode flag when the mode flag's constraints are met.

9. The method of claim 8, further comprising:
    receiving, by the decoder, a regular merge flag after receiving, by the decoder, a subblock merge mode flag when the subblock merge mode flag's constraints are met.

10. The method of claim 1, further comprising:
    receiving, by the decoder, the regular merge flag using Context-adaptive binary arithmetic coding (CABAC) with multiple context models and the selection of the context model is based on coded information.

11. A computing device comprising:
    one or more processors;
    a non-transitory computer-readable memory storing instructions executable by the one or more processors, wherein the one or more processors are configured to:
    acquire, from a decoder, a regular merge flag for a coding unit (CU) that is coded as merge mode and merge related modes;
    when the regular merge flag is one, indicate that a regular merge mode or merge mode with motion vector differences (MMVD) is used by the CU, construct a single merge list for the CU, wherein the single merge list comprises regular motion vector candidates and MMVD motion vector candidates selected by a regular merge index to indicate which candidate is used, wherein the single merge list is constructed for both the regular merge mode and the MMVD; and
    when the regular merge flag is zero, indicate the regular merge mode is not used by the CU, and further receive mode flags to indicate associated merge related modes are used when a mode flag's constraints are met.

12. The computing device of claim 11, further comprising:
receive, by the decoder a MMVD merge flag, MMVD distance index, and MMVD direction index when MMVD flag is equal to one.

13. The computing device of claim 11, wherein the one or more processors are further configured to receive subblock flag and the subblock flag's constraints includes:
acquire a coding block from a decoder, wherein the coding block has a width and height;
determine, by the decoder, whether maximum number of subblock-based merging MVP candidates (MaxNumSubblockMergeCand) is greater than zero;
determine, by the decoder, whether coding block width is greater than equal to eight; and
determine, by the decoder, whether coding block height is greater than equal to eight.

14. The computing device of claim 11, wherein the mode flag is a combined inter and intra prediction (CIIP) flag and the CIIP flag's constraints include:
acquire a coding block from a decoder, wherein the coding block has a width and height;
determine, by the decoder, whether sps_mh_intra_enabled_flag is set;
determine, by the decoder, whether cu_skip_flag is equal to zero;
determine, by the decoder, whether the coding block width times the coding block height is greater than equal to sixty-four;
determine, by the decoder, whether coding block width is less than one hundred and twenty-eight; and
determine, by the decoder, whether coding block height is less than one hundred and twenty-eight.

15. The computing device of claim 11, further comprising:
signal, by the decoder, a regular merge flag before signaling, by the decoder, the mode flag when the mode flag's constraints are met.

16. The computing device of claim 15, further comprising:
signal, by the decoder, a regular merge flag before signaling, by the decoder, a combined inter and intra prediction (CIIP) flag when the CIIP flag's constraints are met.

17. The computing device of claim 11, further comprising:
receive, by the decoder, a regular merge flag after receiving, by the decoder, a mode flag when the mode flag's constraints are met.

18. The computing device of claim 17, further comprising:
receive, by the decoder, a regular merge flag after receiving, by the decoder, a subblock merge mode flag when the subblock merge mode flag's constraints are met.

19. The computing device of claim 11, further comprising:
receive, by the decoder, the regular merge flag using Context-adaptive binary arithmetic coding (CABAC) with multiple context models and the selection of the context model is based on coded information.

20. A non-transitory computer-readable storage medium storing a plurality of programs for execution by a computing device having one or more processors, wherein the plurality of programs, when executed by the one or more processors, cause the computing device to perform operations including:
acquiring, from a decoder, a regular merge flag for a coding unit (CU) that is coded as merge mode and merge related modes;
when the regular merge flag is one, indicating that a regular merge mode or merge mode with motion vector differences (MMVD) is used by the CU, constructing a single merge list for the CU, wherein the single merge list comprises regular motion vector candidates and MMVD motion vector candidates selected by a regular merge index to indicate which candidate is used, wherein the single merge list is constructed for both the regular merge mode and the MMVD; and
when the regular merge flag is zero, indicating the regular merge mode is not used by the CU, and further receiving mode flags to indicate associated merge related modes are used when a mode flag's constraints are met.

* * * * *